(12) United States Patent
Tan et al.

(10) Patent No.: US 11,331,798 B2
(45) Date of Patent: May 17, 2022

(54) ROBOT SYSTEM AND ROBOT CONTROLLER

(71) Applicant: KAWASAKI JUKOGYO KABUSHIKI KAISHA, Kobe (JP)

(72) Inventors: Haruhiko Tan, Kobe (JP); Masahiko Sumitomo, Kakogawa (JP); Ryota Sakai, Akashi (JP); Jun Kanzaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 419 days.

(21) Appl. No.: 16/479,671

(22) PCT Filed: Jan. 19, 2018

(86) PCT No.: PCT/JP2018/001551
§ 371 (c)(1),
(2) Date: Jul. 22, 2019

(87) PCT Pub. No.: WO2018/135613
PCT Pub. Date: Jul. 26, 2018

(65) Prior Publication Data
US 2021/0362326 A1 Nov. 25, 2021

(30) Foreign Application Priority Data
Jan. 20, 2017 (JP) .............................. JP2017-008272

(51) Int. Cl.
B25J 13/06 (2006.01)
B25J 9/16 (2006.01)
(Continued)

(52) U.S. Cl.
CPC ............. B25J 9/163 (2013.01); B25J 9/0081 (2013.01); B25J 13/06 (2013.01); B25J 19/06 (2013.01)

(58) Field of Classification Search
CPC . B25J 13/06; B25J 9/163; B25J 9/0081; B25J 19/06; G05B 19/425;
(Continued)

(56) References Cited

U.S. PATENT DOCUMENTS 6,062,241 A 5/2000 Tateyama et al.
6,249,718 B1 * 6/2001 Gilliland ................ B25J 9/1671
219/130.4
(Continued)

FOREIGN PATENT DOCUMENTS

EP 0 553 359 A1 8/1993
JP H05-119801 A 5/1993
(Continued)

OTHER PUBLICATIONS

Fukui et al., Development of teaching pendant optimized for robot application, 2009, IEEE, p. 72-77 (Year: 2009).*
(Continued)

Primary Examiner — McDieunel Marc
(74) Attorney, Agent, or Firm — Oliff PLC

(57) ABSTRACT

A robot system includes: a robot; a portable operation terminal having a teaching function; and a robot controller having operation modes including a teaching mode and another operation mode different from the teaching mode, the teaching mode being an operation mode for teaching a motion to the robot through the portable operation terminal. The robot controller is configured to: detect electrical connection and electrical disconnection between the robot controller and the portable operation terminal; change an operation mode in which to operate the robot to the teaching mode when detecting the connection between the robot controller and the portable operation terminal; and change the operation mode in which to operate the robot to the other operation mode different from the teaching mode when
(Continued)

detecting the disconnection between the robot controller and the portable operation terminal.

20 Claims, 9 Drawing Sheets

(51) Int. Cl.
*B25J 9/00* (2006.01)
*B25J 19/06* (2006.01)

(58) Field of Classification Search
CPC .......... G05B 2219/39449; G05B 2219/39083; G05B 2219/39448; G05B 19/00; G05B 2219/36159; G05B 2219/36162; G05B 2219/39139; G05B 2219/40392; G06T 1/0014; G08C 17/00
See application file for complete search history.

(56) References Cited

U.S. PATENT DOCUMENTS

| | | | | |
|---|---|---|---|---|
| 6,332,102 B1* | 12/2001 | Nakajima | ................ | B25J 13/06 |
| | | | | 318/568.11 |
| 6,853,878 B2* | 2/2005 | Hirayama | ............ | G05B 19/425 |
| | | | | 700/245 |
| 6,853,881 B2* | 2/2005 | Watanabe | .............. | B25J 9/1671 |
| | | | | 219/121.63 |
| 7,177,724 B2* | 2/2007 | Cantello | .................. | B25J 13/06 |
| | | | | 700/247 |
| 7,321,808 B2* | 1/2008 | Nagamatsu | ............ | B25J 9/1666 |
| | | | | 219/121.61 |
| 7,373,220 B2* | 5/2008 | Watanabe | .............. | B25J 9/1671 |
| | | | | 700/264 |
| 7,376,488 B2* | 5/2008 | Watanabe | .............. | B25J 9/1664 |
| | | | | 700/257 |
| 7,424,341 B2* | 9/2008 | Watanabe | ............. | G06T 1/0014 |
| | | | | 700/245 |
| 8,005,572 B2* | 8/2011 | Evans | .................... | B25J 9/1656 |
| | | | | 700/248 |
| 2010/0106299 A1 | 4/2010 | Nagata | | |
| 2011/0010006 A1* | 1/2011 | Tani | .......................... | B25J 19/06 |
| | | | | 700/245 |
| 2013/0151010 A1* | 6/2013 | Kubota | .................... | B25J 13/06 |
| | | | | 700/264 |
| 2015/0239120 A1 | 8/2015 | Yamamoto | | |
| 2016/0031077 A1 | 2/2016 | Inaba et al. | | |
| 2017/0093309 A1* | 3/2017 | Nishino | .............. | H02P 29/0241 |
| 2019/0126489 A1* | 5/2019 | Wada | ....................... | B25J 13/06 |

FOREIGN PATENT DOCUMENTS

| | | |
|---|---|---|
| JP | H05-204439 A | 8/1993 |
| JP | H10-316242 A | 12/1998 |
| JP | 2000-24971 A | 1/2000 |
| JP | 2003-272771 A | 9/2003 |
| JP | 2005-118967 A | 5/2005 |
| JP | 2007-268662 A | 10/2007 |
| JP | 2009-262257 A | 11/2009 |
| JP | 2010-052106 A | 3/2010 |
| JP | 4556802 B2 | 10/2010 |
| JP | 4990504 B2 | 8/2012 |
| WO | 2006-137239 A1 | 12/2006 |

OTHER PUBLICATIONS

Jan et al., Smartphone Based Control Architecture of Teaching Pendant for Industrial Manipulators, 2013, IEEE, p. 370-375 (Year: 2013).*

Daniel et al., New approach for industrial robot controller user interface, 2013, IEEE, p. 7831-7836 (Year: 2013).*

Abderrahmane et al., Study and Validation of Singularities fora Fanuc LR Mate 200iC Robot, IEEE, p. 2014, p. 432-437 (Year: 2014).*

* cited by examiner

ROBOT SYSTEM AND ROBOT CONTROLLER

TECHNICAL FIELD

The present invention relates to a robot system and a robot controller.

BACKGROUND ART

Robot systems of a teaching/playback type have operation modes including a teaching mode and a repeat mode. The teaching mode is an operation mode for teaching a motion to a robot through a teach pendant. The repeat mode is an operation mode for causing the robot to repeat a motion that has previously been taught in the teaching mode.

In conventional robot systems, in consideration of safety, a robot controller thereof is equipped with a mode changing switch by which to change the operation mode between the teaching mode and the repeat mode. Accordingly, an operator operates the mode changing switch of the robot controller to change the operation mode to the repeat mode to play back a work program, thereby checking the transmission/reception of signals to/from the robot and peripheral equipment according to the work program. However, in the case of adopting such a conventional robot system operation procedure, each time the operator performs the operation check of the robot according to the work program, the operator needs to directly operate the mode changing switch of the robot controller, which results in onerous operations for the operator. This problem is prominent particularly in the case of operating a robot system that is formed by: a plurality of robots; a plurality of controllers connected to the respective robots; and a teach pendant common to the plurality of robots (see Patent Literature 1). For this reason, it is desirable to adopt a configuration in which motions of one or a plurality of robots are controllable by a single controller, and a single teach pendant is usable in common for the plurality of robots.

In recent years, in order to further improve convenience, robot systems in which a teach pendant thereof is equipped with a mode changing switch have been proposed. Patent Literature 2 discloses a robot system in which a teach pendant thereof includes: a robot operating unit; and a mode selector by which to select whether to perform a repeat mode or a teaching mode. A robot controller of the robot system includes a playback mode enabling device configured to output an enabling signal and a prohibiting signal. The enabling signal enables a mode change to the repeat mode. The prohibiting signal prohibits the mode change to the playback mode. Only when the mode selector has selected an operation mode and the playback mode enabling device has outputted the enabling signal, transition to the playback mode is performed. Patent Literature 3 discloses a robot system that performs a mode change in accordance with whether or not a mechanical key has been inserted in a teach pendant. Patent Literature 4 discloses a robot system capable of: detecting the entry/exit of a worker through a safe guard fence; changing the operation mode to a repeat mode when detecting the exit of the worker through the safe guard fence; and changing the operation mode to a teaching mode when detecting the entry of the worker through the safe guard fence. Patent Literature 5 discloses a robot system in which a teach pendant or robot controller thereof is equipped with an operation mode changing switch.

CITATION LIST

Patent Literature

PTL 1: Japanese Patent No. 4990504
PTL 2: Japanese Patent No. 4556802
PTL 3: Japanese Laid-Open Patent Application Publication No. 2010-052106
PTL 4: Japanese Laid-Open Patent Application Publication No. 2009-262257
PTL 5: Japanese National Phase PCT Laid-Open Application Publication No. 2006-137239

SUMMARY OF INVENTION

Technical Problem

However, in the above conventional robot systems, the operator needs to perform the operation of changing the operation mode between the teaching mode and the repeat mode, which results in onerous operations for the operator. There is also a problem that operational errors may occur due to insufficient skills of the operator.

The present invention has been made to solve the above-described problems. An object of the present invention is to provide a robot system that makes it possible to prevent operational errors from being made by the operator and to readily and assuredly change the operation mode in which to operate the robot.

Solution to Problem

In order to solve the above-described problems, a robot system according to one aspect of the present invention includes: a robot; a portable operation terminal having a teaching function; and a robot controller having operation modes including a teaching mode and another operation mode different from the teaching mode, the teaching mode being an operation mode for teaching a motion to the robot through the portable operation terminal. The robot controller is configured to: detect electrical connection and electrical disconnection between the robot controller and the portable operation terminal; change an operation mode in which to operate the robot to the teaching mode when detecting the connection between the robot controller and the portable operation terminal; and change the operation mode in which to operate the robot to the other operation mode different from the teaching mode when detecting the disconnection between the robot controller and the portable operation terminal.

It should be noted that "the other operation mode different from the teaching mode" is an operation mode in which to operate the robot without requiring the use of the portable operation terminal. Examples of "the other operation mode different from the teaching mode" include a repeat mode (automatic operation mode) and a stop mode for stopping the robot from operating.

According to the above configuration, when the electrical connection between the robot controller and the teach pendant (i.e., the portable operation terminal) is detected, the operation mode in which to operate the robot is changed to the teaching mode, whereas when the disconnection between the robot controller and the teach pendant is detected, the operation mode in which to operate the robot is changed to, for example, the repeat mode. That is, when the operator merely attaches/detaches the teach pendant to/from the robot controller, a mode change between the teaching mode and the other operation mode different from the teaching mode is performed automatically. Since the operator is not required to perform mode change operations, the workload on the operator is reduced. This makes it possible to prevent operational errors from being made by the operator and to readily and assuredly change the operation mode in which to operate the robot.

In addition, the above robot system can be configured less expensively than a system that includes an operation box separately from the teach pendant, the operation box being provided with a mode changing switch.

The above robot system may further include a shorting plug. The robot controller may further include: an interface connector including a power supply terminal, a first input terminal, and a second input terminal; and a relay connector including a first terminal, a second terminal, and a third terminal, the first terminal being connected to the power supply terminal, the second terminal being connected to the second input terminal, the third terminal being connected to the first input terminal. In a first connection mode in which the first terminal and the second terminal of the relay connector are short-circuited via a connector mounted to a distal end of a cable intended for the portable operation terminal, when a power supply voltage is inputted to the second input terminal, the robot controller may detect the connection between the robot controller and the portable operation terminal, and change the operation mode in which to operate the robot to the teaching mode. In a second connection mode in which the first terminal and the third terminal of the relay connector are short-circuited via the shorting plug, when the power supply voltage is inputted to the first input terminal, the robot controller may detect the disconnection between the robot controller and the portable operation terminal, and change the operation mode in which to operate the robot to the other operation mode different from the teaching mode.

In the second connection mode, "the other operation mode different from the teaching mode" may be a repeat mode.

According to the above configuration, the robot controller and the teach pendant (i.e., the portable operation terminal) are connected to each other via the relay connector. This allows the operator to attach/detach the teach pendant to/from the robot controller (i.e., perform a mode change) at a location away from a facility (e.g., semiconductor processing facility) where the robot and the robot controller are installed. Thus, the operator is not required to enter the facility to perform the attachment/detachment work. Consequently, the workload of the operator is reduced.

The above robot system may further include a first robot, a second robot, a first shorting plug, and a second shorting plug. The robot controller may further include: an interface connector including the power supply terminal, a first input terminal, a second input terminal, and a third input terminal; a first relay connector including a first terminal, a second terminal, and a third terminal, the first terminal being connected to the power supply terminal, the second terminal being connected to the second input terminal; and a second relay connector including a first terminal, a second terminal, and a third terminal, the first terminal being connected to the third terminal of the first relay connector, the second terminal being connected to the third input terminal, the third terminal being connected to the first input terminal. In a first connection mode in which the first terminal and the second terminal of the first relay connector are short-circuited via a connector mounted to a distal end of a cable intended for the portable operation terminal, when a power supply voltage is inputted to the second input terminal, the robot controller may detect the connection between the robot controller and the portable operation terminal, change the operation mode in which to operate the first robot to the teaching mode, and change the operation mode in which to operate the second robot to the other operation mode different from the teaching mode. In a second connection mode in which the first terminal and the third terminal of the first relay connector are short-circuited via the first shorting plug, and the first terminal and the second terminal of the second relay connector are short-circuited via the connector mounted to the distal end of the cable intended for the portable operation terminal, when the power supply voltage is inputted to the third input terminal, the robot controller may detect the connection between the robot controller and the portable operation terminal, change the operation mode in which to operate the second robot to the teaching mode, and change the operation mode in which to operate the first robot to the other operation mode different from the teaching mode. In a third connection mode in which the first terminal and the third terminal of the first relay connector are short-circuited via the first shorting plug, and the first terminal and the third terminal of the second relay connector are short-circuited via the second shorting plug, when the power supply voltage is inputted to the first input terminal, the robot controller may detect the disconnection between the robot controller and the portable operation terminal, and change the operation mode in which to operate the first robot and the second robot to the other operation mode different from the teaching mode.

According to the above configuration, the robot controller, which is connected to the two robots, and the teach pendant (i.e., the portable operation terminal) are connected to each other via the two relay connectors. This allows the operator to attach/detach the teach pendant (i.e., the portable operation terminal) to/from the robot controller (i.e., perform a mode change) at a location away from a facility (e.g., semiconductor processing facility) where the two robots and the robot controller are installed. Thus, the operator is not required to enter the facility to perform the attachment/detachment work. Consequently, the workload of the operator is reduced.

In the first connection mode, "the other operation mode different from the teaching mode", in which to operate the second robot, may be a stop mode. In the second connection mode, "the other operation mode different from the teaching mode", in which to operate the first robot, may be a stop mode. In the third connection mode, "the other operation mode different from the teaching mode", in which to operate the first robot and the second robot, may be a repeat mode.

In the above robot system, the robot controller may have a hot swapping function. A controller-side connector and a portable-operation-terminal-side connector, by which the robot controller and the portable operation terminal are connected to each other, may each include a ground terminal, a signal terminal, and a power supply terminal. When the controller-side connector and the portable-operation-terminal-side connector are connected to each other, the ground terminals thereof may be connected to each other first among the ground terminals, the signal terminals, and the power supply terminals of the controller-side connector and the portable-operation-terminal-side connector, and when the controller-side connector and the portable-operation-terminal-side connector are disconnected from each other, the ground terminals thereof may be blocked from each other last among the ground terminals, the signal terminals, and the power supply terminals of the controller-side connector and the portable-operation-terminal-side connector.

According to the above configuration, since the robot controller has the hot swapping function, the operator is not required to stop the power supply of the robot controller when attaching/detaching the controller-side connector and the portable-operation-terminal-side connector, by which to connect the robot controller and the teach pendant (the portable operation terminal), to/from each other. This eliminates onerous operations for the operator, such as restarting of the system. As a result, the workload of the operator is reduced. The portable operation terminal may be a teach pendant, or may be a mobile information terminal such as a tablet terminal or smartphone.

A robot controller according to another aspect of the present invention is a robot controller having operation modes including a teaching mode and another operation mode different from the teaching mode, the teaching mode being an operation mode for teaching a motion to a robot through a portable operation terminal having a teaching function. The robot controller is configured to: detect electrical connection and electrical disconnection between the robot controller and the portable operation terminal; change an operation mode in which to operate the robot to the teaching mode when detecting the connection between the robot controller and the portable operation terminal; and change the operation mode in which to operate the robot to the other operation mode different from the teaching mode when detecting the disconnection between the robot controller and the portable operation terminal.

Advantageous Effects of Invention

The present invention makes it possible to prevent operational errors from being made by the operator and to readily and assuredly change the operation mode in which to operate the robot.

DESCRIPTION OF EMBODIMENTS

Figure 1:
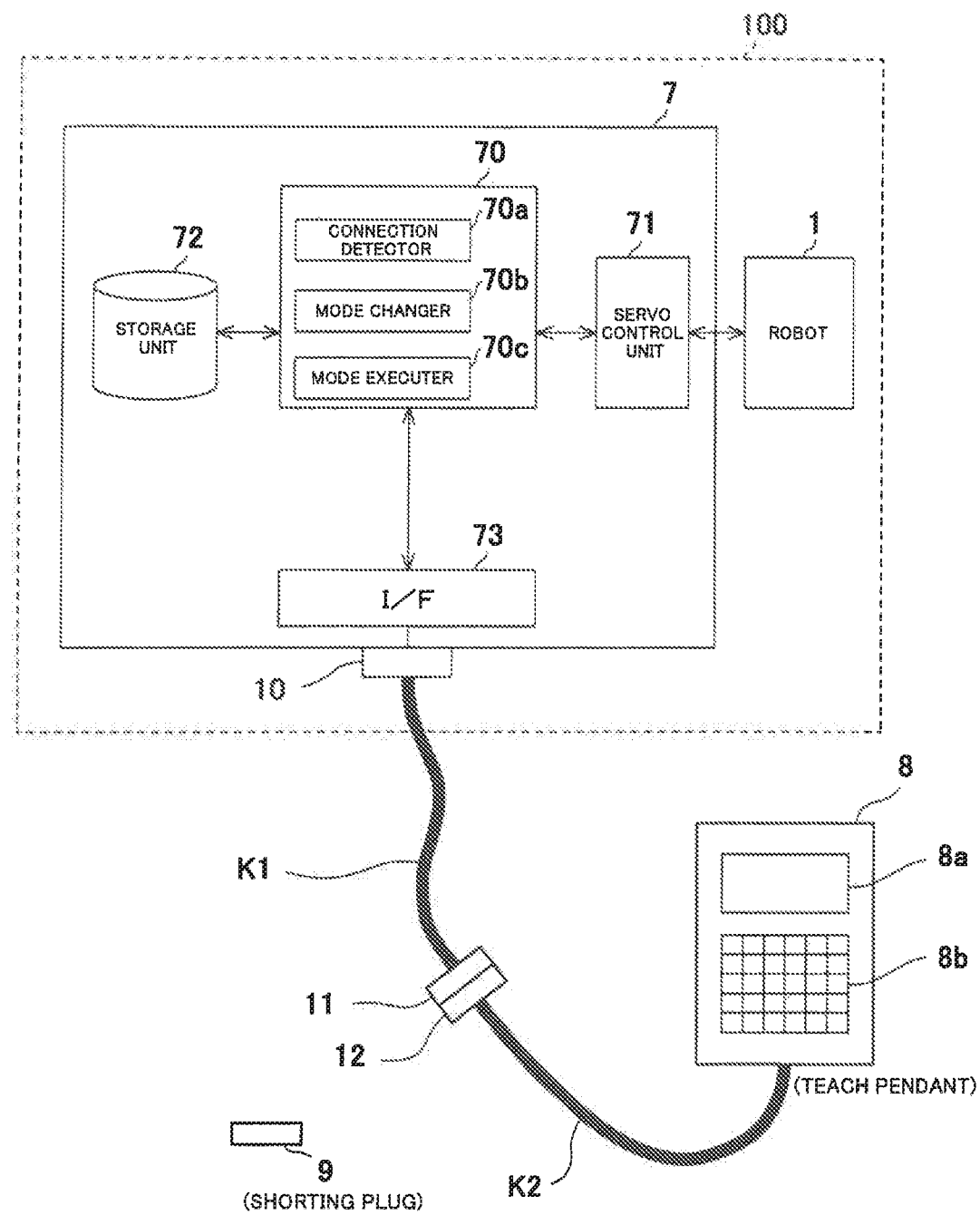
FIG. 1 is a block diagram schematically showing the configuration of a robot system according to Embodiment 1 of the present invention.

Hereinafter, embodiments of the present invention are described with reference to the drawings. In the drawings, the same or corresponding elements are denoted by the same reference signs, and repeating the same descriptions is avoided below.

Embodiment 1

FIG. 1 is a block diagram showing the configuration of a robot system 120 according to Embodiment 1 of the present invention. As shown in FIG. 1, the robot system 120 includes: a robot 1; a controller 7 configured to control the operation of the robot 1; and a teach pendant 8 connectable to the controller 7. The teach pendant 8 corresponds to a "portable operation terminal" of the present invention.

The configuration of the robot 1 is not particularly limited. For example, the robot 1 is realized by a horizontal articulated robot including a hand for holding a semiconductor wafer. In the present embodiment, the robot 1 is installed, together with the controller 7 of the robot 1, in a semiconductor processing facility 100 for processing semiconductor wafers.

The controller 7 of the robot 1 is provided with an I/F connector 10 to be connected to the teach pendant 8. A controller cable K1 intended for the controller 7 and having a predetermined length is connected to the I/F connector 10, and a relay connector 11 is mounted to the distal end of the controller cable K1. A teach pendant cable K2 intended for the teach pendant 8 and having a predetermined length is connected to the teach pendant 8. A connector 12 attachable to the relay connector 11 (hereinafter, "TP connector 12") is mounted to the distal end of the teach pendant cable K2. The teach pendant 8 is connected to the controller 7 via the I/F connector 10, the cable K1, the relay connector 11, the TP connector, and the cable K2, which are provided outside the controller 7. In the present embodiment, the teach pendant 8 is disposed outside the semiconductor processing facility 100.

The controller 7 includes, for example: a control unit 70 including an arithmetic operation device such as a CPU; a servo control unit 71; a storage unit 72 including memories such as a ROM and RAM; and an external I/F 73. The controller 7 may be configured as a single controller performing centralized control, or may be configured as a plurality of controllers performing distributed control in cooperation with each other. In the present embodiment, the control unit 70 includes a connection detector 70a, a mode changer 70b, and a mode executer 70c. These function blocks (70a to 70c) are realized when the control unit 70 executes a predetermined control program stored in the storage unit 72.

The controller 7 has operation modes including a teaching mode and other operation modes different from the teaching mode. The teaching mode is an operation mode for teaching motions to the robot 1 through the teach pendant 8. It should be noted that the other operation modes different from the teaching mode are operation modes in which to operate the robot 1 without requiring the use of the teach pendant 8.

The connection detector 70a is configured to detect electrical connection and electrical disconnection between the controller 7 and the teach pendant 8.

In the present embodiment, the mode changer 70b is configured to change the operation mode in which to operate the robot 1 to the teaching mode if the connection detector 70a detects the connection between the controller 7 and the teach pendant 8, and change the operation mode in which to operate the robot 1 into a repeat mode if the connection detector 70a detects the disconnection between the controller 7 and the teach pendant 8. The teaching mode herein is an operation mode in which to create or edit a motion program for causing the robot 1 to make various motions to perform, for example, a particular task. The repeat mode is an operation mode in which to playback the motion program created or edited in the teaching mode, thereby performing the intended particular task. When performing the repeat mode, the use of the teach pendant 8 is not required.

The mode executer 70c executes an operation mode in which to operate the robot, the operation mode being selected by the mode changer 70b. Operation modes herein include the teaching mode and other operation modes different from the teaching mode. The other operation modes different from the teaching mode include: the repeat mode for causing the robot 1 to repeat motions that have previously been taught in the teaching mode; and a stop mode for stopping the robot from operating.

The mode executer 70c is configured to, in the teaching mode, control motions of a robotic arm 4 in accordance with operation information generated by an operating unit 8b, whereas in the repeat mode, control motions of the robotic arm 4 in accordance with the motion program, which is stored in the storage unit 72. Specifically, the mode executer 70c: generates a position command value for each servomotor (not shown) that drives a corresponding one of drive units (not shown) of the robot 1; and generates a speed command value based on a deviation between the generated position command value and a detection value (actual value) detected by an encoder (not shown) provided on the servomotor. Then, the mode executer 70c generates a torque command value (electric current command value) based on a deviation between the generated speed command value and a current speed value. Based on a deviation between the generated electric current command value and a detection value (actual value) detected by an electric current sensor (not shown), the mode executer 70c generates a control command and outputs the control command to the servo control unit 71.

The servo control unit 71 generates an electric current based on the control command generated by the mode executer 70c, and feeds the generated electric current to the servomotor of each drive unit of the robot 1, thereby causing the robot 1 to make a motion.

Teaching data generated in the teaching mode is stored in the storage unit 72 as a predetermined motion program. In the repeat mode, the control unit 70 reads and executes the motion program to control the motions of the robot 1. The predetermined motion program contains, for example, a command to cause a hand 2 of the robot 1 to move to a predetermined position.

The teach pendant 8 includes a display unit 8a and the operating unit 8b. The display unit 8a and the operating unit 8b include various operation keys by which to give commands to: operate the robot 1; start, end, and stop a repeat operation or teaching; and store teaching points. The operating unit 8b is configured to generate operation information in accordance with an operation, and output the generated operation information to the controller 7. The controller 7 is configured to receive inputs of operation information and various commands from the operating unit 8b, and output various command values, calculation results, etc. to the display unit 8a. An operator operates the teach pendant 8 from the outside of the semiconductor processing facility 100 to operate the robot 1 by remote control, thereby performing a teaching operation. In the present embodiment, the robot system 120 further includes a shorting plug 9. The operator uses the shorting plug 9 when changing the operation mode from the teaching mode to the repeat mode.

Operation Examples

Next, operation examples of the robot system 120 are described. First, as shown in FIG. 1, the operator connects the teach pendant 8 to the controller 7 in order to teach motions to the robot 1 by using the teach pendant 8 (first connection mode). Here, the relay connector 11 mounted to the distal end of the controller cable K1 is connected to the TP connector 12 mounted to the distal end of the teach pendant cable K2.

Figure 2:
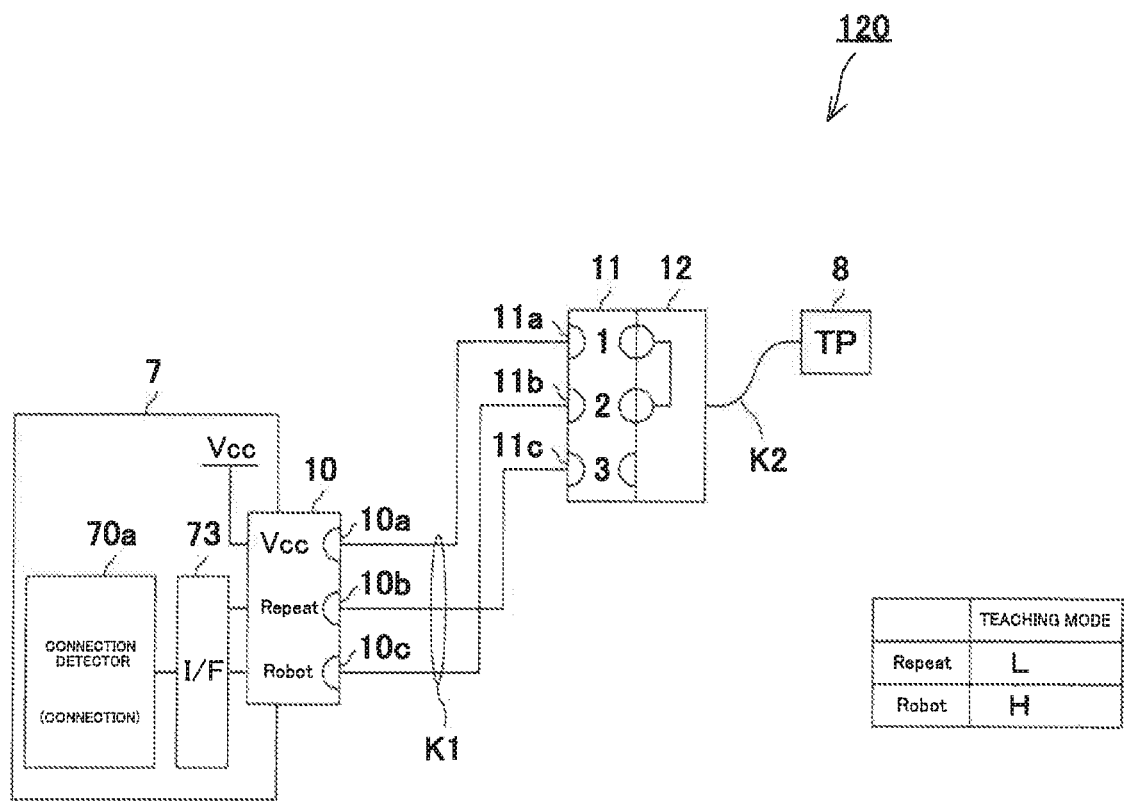
FIG. 2 shows a first connection mode of the robot system of FIG. 1.

FIG. 2 schematically shows the first connection mode of the robot system 120. As shown in FIG. 2, the I/F connector 10 of the controller 7 includes: a power supply terminal 10a, to which a power supply voltage (e.g., DC 24V) is supplied from an internal power supply (not shown) of the controller 7; a first input terminal 10b, to which a detection signal (e.g., DC 24V) indicating disconnection (second connection mode) is inputted; and a second input terminal 10c, to which a detection signal (e.g., DC 24V) indicating connection (first connection mode) is inputted. The relay connector 11 is mounted to the distal end of the controller cable K1. The relay connector 11 includes: a first terminal 11a connected to the power supply terminal 10a of the I/F connector 10; a second terminal 11b connected to the second input terminal 10c of the I/F connector 10; and a third terminal 11c connected to the first input terminal 10b of the I/F connector 10.

The TP connector 12 mounted to the distal end of the teach pendant cable K2 is configured to short-circuit the first terminal 11a and the second terminal 11b of the relay connector 11. Accordingly, the first terminal 11a and the second terminal 11b of the relay connector 11 are short-circuited via the TP connector 12.

The power supply voltage (e.g., DC 24V) is outputted from the power supply terminal 10a of the I/F connector 10 of the controller 7, and the power supply voltage is inputted to the first terminal 11a of the relay connector 11 via the controller cable K1. Since the first terminal 11a and the second terminal 11b of the relay connector 11 are short-circuited via the TP connector 12, the power supply voltage is outputted from the second terminal 11b of the relay connector 11, and the power supply voltage (i.e., high level voltage) is inputted to the second input terminal 10c of the I/F connector 10 via the controller cable K1 as the detection signal indicating connection. At the time, since the third terminal 11c of the relay connector 11 is shorted by the TP connector 12, the first input terminal 10b of the I/F connector 10, which is connected to the third terminal 11c via the controller cable K1, is also shorted. In the present embodiment, in the first connection mode, a ground potential (i.e., low level voltage) is inputted to the first input terminal 10b of the I/F connector 10.

The connection detector 70a detects the detection signal indicating connection (i.e., the power supply voltage), which is inputted to the second input terminal 10c of the I/F connector 10, thereby detecting the connection between the controller 7 and the teach pendant 8. Accordingly, the mode changer 70b changes the operation mode in which to operate the robot 1 to the teaching mode.

Figure 3:
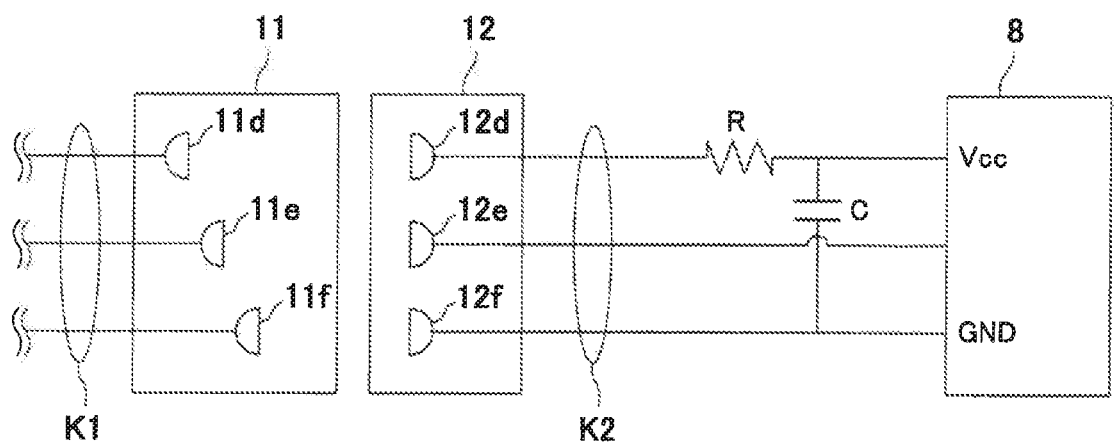
FIG. 3 is a schematic diagram showing other connection terminals of connectors in the first connection mode.

FIG. 3 is a schematic diagram showing other connection terminals of the relay connector 11 and the TP connector 12 in the first connection mode. As shown in FIG. 3, the relay connector 11 includes a power supply terminal 11d, a signal terminal 11e, and a ground terminal 11f. A power supply line of the controller cable K1 is connected to the power supply terminal 11d. A signal line of the controller cable K1, through which operation information, various commands, image signals, etc. are transmitted, is connected to the signal terminal 11e. A ground line of the controller cable K1 is connected to the ground terminal 11f. The TP connector 12 includes a power supply terminal 12d, a signal terminal 12e, and a ground terminal 12f. A power supply line of the teach pendant cable K2 is connected to the power supply terminal 12d. A signal line of the teach pendant cable K2, through which operation information, various commands, image signals, etc. are transmitted, is connected to the signal terminal 12e. A ground line of the teach pendant cable K2 is connected to the ground terminal 12f.

The controller 7 of the robot 1 has a hot swapping function, and the relay connector 11 and the TP connector 12 are hot swapping connectors. The relay connector 11 and the TP connector 12 are configured such that when the relay connector 11 and the TP connector 12 are connected to each other, the ground terminals (11f, 12f) are connected to each other first among the ground terminals (11f, 12f), the signal terminals (11e,*12e), and the power supply terminals (11d, 12d) of the relay connector 11 and the TP connector 12, whereas when the relay connector 11 and the TP connector 12 are disconnected from each other, the ground terminals (11f, 12f) are blocked from each other last among the ground terminals (11f, 12f), the signal terminals (11e, 12e), and the power supply terminals (11d, 12d) of the relay connector 11 and the TP connector 12. In the present embodiment, the lengths of the respective terminals of the relay connector 11 are varied from each other such that, when the relay connector 11 and the TP connector 12 are connected to each other, connection is first established between the ground terminals (11f, 12f), then established between the signal terminals (11e, 12e), and thereafter established between the power supply terminals (11d, 12d), whereas when the relay connector 11 and the TP connector 12 are disconnected, the connection is first blocked between the power supply terminals (11d, 12d), then blocked between the signal terminals (11e, 12e), and thereafter blocked between the ground terminals (11f, 12f). In the present embodiment, an inrush current limit circuit formed by a resistance element R and a capacitance element C is provided between the teach pendant 8 and the teach pendant cable K2.

Owing to the above configuration, the operator is allowed to attach/detach the TP connector 12 to/from the relay connector 11 of the controller 7 without stopping the main power supply of the controller 7. When the connection between the controller 7 and the teach pendant 8 is detected, the operation mode in which to operate the robot is automatically changed to the teaching mode. Accordingly, in the teaching mode, the operator operates the teach pendant 8 to operate the robot 1 by remote control, thereby performing a teaching operation. In the present embodiment, the mode executer 70c controls motions of the robotic arm 4 in accordance with the operation information generated by the operating unit 8b, thereby causing the robotic arm 4 to perform a particular task. The predetermined motion program created or edited in the teaching mode is stored in the storage unit 72.

Figure 4:
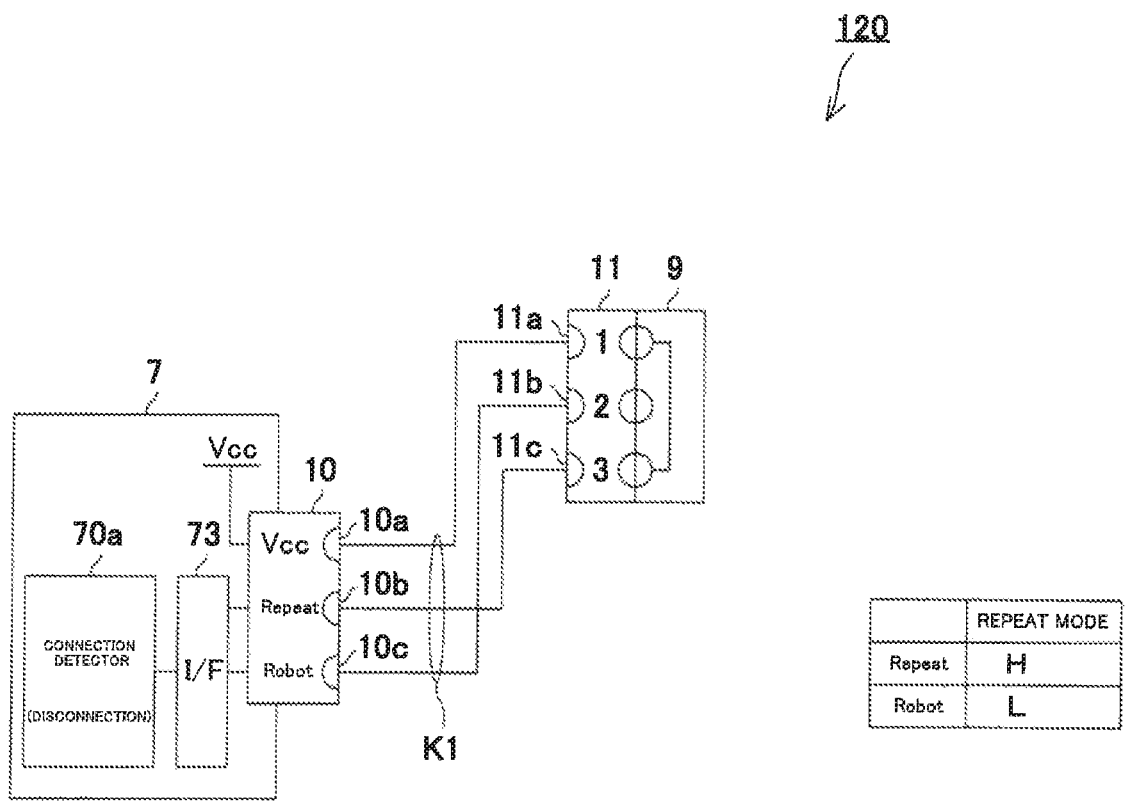
FIG. 4 shows a second connection mode of the robot system.

Next, in order to cause the robot 1 to repeat motions that have previously been taught in the teaching mode, the operator disconnects the teach pendant 8 from the controller 7, and connects the shorting plug 9 to the relay connector 11. FIG. 4 schematically shows the second connection mode of the robot system 120. As shown in FIG. 4, the shorting plug 9 is configured to short-circuit the first terminal 11a and the third terminal 11c of the relay connector 11.

A power supply voltage (e.g., DC 24V) is outputted from the power supply terminal 10a of the I/F connector 10 of the controller 7, and the power supply voltage is inputted to the first terminal 11a of the relay connector 11 via the controller cable K1. Since the first terminal 11a and the third terminal 11c of the relay connector 11 are short-circuited via the shorting plug 9, the power supply voltage is outputted from the third terminal 11c of the relay connector 11, and the power supply voltage (i.e., high level voltage) is inputted to the first input terminal 10b of the I/F connector 10 via the controller cable K1 as the detection signal indicating disconnection. At the time, since the second terminal 11b of the relay connector 11 is shorted by the shorting plug 9, the second input terminal 10c of the I/F connector 10, which is connected to the second terminal 11b via the controller cable K1, is also shorted. In the present embodiment, in the second connection mode, a ground potential (i.e., low level voltage) is inputted to the second input terminal 10c of the I/F connector 10.

The connection detector 70a detects the detection signal indicating disconnection (i.e., the power supply voltage), which is inputted to the first input terminal 10b of the I/F connector 10, thereby detecting the disconnection between the controller 7 and the teach pendant 8. Accordingly, the mode changer 70b changes the operation mode in which to operate the robot 1 to the repeat mode. That is, when the disconnection between the controller 7 and the teach pendant 8 is detected, the operation mode in which to operate the robot is automatically changed to the teaching mode.

The mode executer 70c reads the motion program created or edited in the teaching mode from the storage unit 72, and controls motions of the robotic arm 4 in accordance with the motion program, thereby causing the robotic arm 4 to perform a particular task.

Thus, according to the present embodiment, when the connection between the controller 7 of the robot 1 and the teach pendant 8 is detected, the operation mode in which to operate the robot 1 is changed to the teaching mode, whereas when the disconnection between the controller 7 and the teach pendant 8 is detected, the operation mode in which to operate the robot 1 is changed to the repeat mode. That is, when the operator merely attaches/detaches the teach pendant 8 to/from the controller 7, a mode change between the teaching mode and the repeat mode is performed automatically. Since the operator is not required to perform mode change operations, the workload on the operator is reduced. This makes it possible to prevent operational errors from being made by the operator and to readily and assuredly change the operation mode in which to operate the robot.

In the present embodiment, in the second connection mode (see FIG. 4), the controller 7 is configured to change the operation mode to the repeat mode when the power supply voltage is inputted to the first input terminal 10b of the IF connector 10. However, at the time, the controller 7 may change the operation mode not to the repeat mode, but to another operation mode (e.g., stop mode) different from the teaching mode, so long as this other operation mode does not require the use of the teach pendant 8.

In the present embodiment, the controller 7 of the robot 1 and the teach pendant 8 are connected to each other via the relay connector 11 (see FIG. 1). This allows the operator to attach/detach the teach pendant 8 to/from the controller 7 (i.e., perform a mode change) outside the semiconductor processing facility 100. Thus, the operator is not required to enter the facility to perform the attachment/detachment work. Consequently, the workload of the operator is reduced.

Since the controller 7 has the hot swapping function, the operator is not required to stop the power supply of the controller 7 when attaching/detaching the relay connector 11 and the TP connector 12, by which to connect the controller 7 and the teach pendant 8, to/from each other. This eliminates onerous operations for the operator, such as restarting of the system. As a result, the workload of the operator is reduced.

Comparative Example

Figure 5:
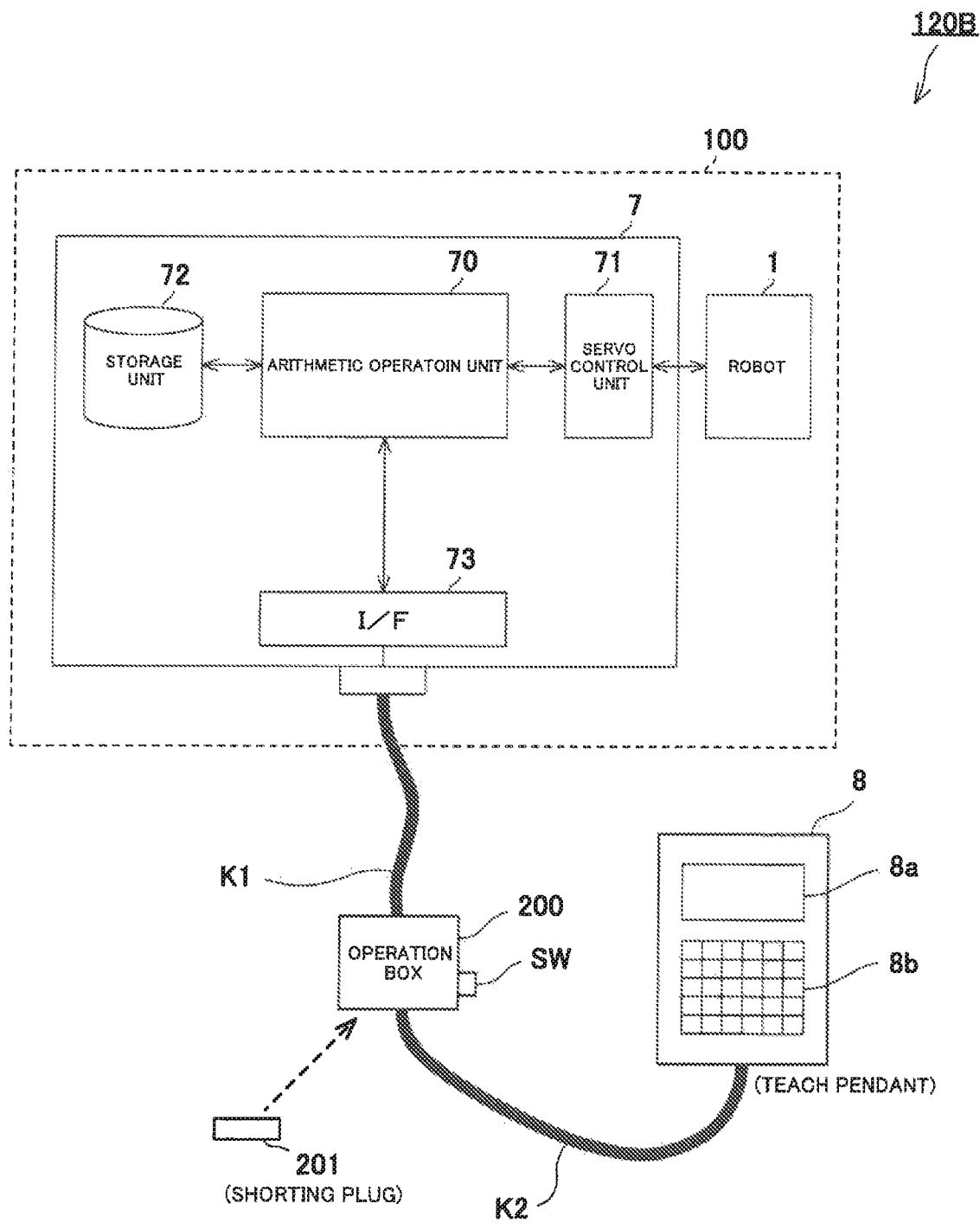
FIG. 5 is a block diagram schematically showing the configuration of a robot system according to a comparative example in comparison with the robot system of FIG. 1.

FIG. 5 is a block diagram schematically showing the configuration of a robot system according to a comparative example in comparison with the present embodiment. As shown in FIG. 5, a robot system 120B according to the comparative example is different from the robot system 120 in the following point: the robot system 120B includes an operation box 200 separately from the teach pendant 8, the operation box 200 being provided with a switch SW for changing the operation mode. In the comparative example, the operator operates the switch SW of the operation box 200 outside the semiconductor processing facility 100, thereby changing the operation mode. In the teaching mode, the operator operates the teach pendant 8 to perform a teaching operation, whereas in the repeat mode, the operator disconnects the operation box 200 and the teach pendant 8 from each other, and short-circuits terminals of the operation box 200 by a shorting plug 201.

The robot system 120B of the comparative example is configured such that the operation mode is changed by operating the switch SW. Therefore, the operation box 200 is an essential component. On the other hand, in the above-described present embodiment (see FIG. 1), the operation mode is changed by connecting/disconnecting the teach pendant 8. Therefore, the installation of the operation box 200 is unnecessary. According to the present embodiment, the robot system 120 can be realized less expensively than the robot system 120B of the comparative example.

Embodiment 2

Next, Embodiment 2 of the present invention is described, in which the description of configurational features common between Embodiment 1 and Embodiment 2 is omitted, and differences in configuration from Embodiment 1 are only described.

Figure 6:
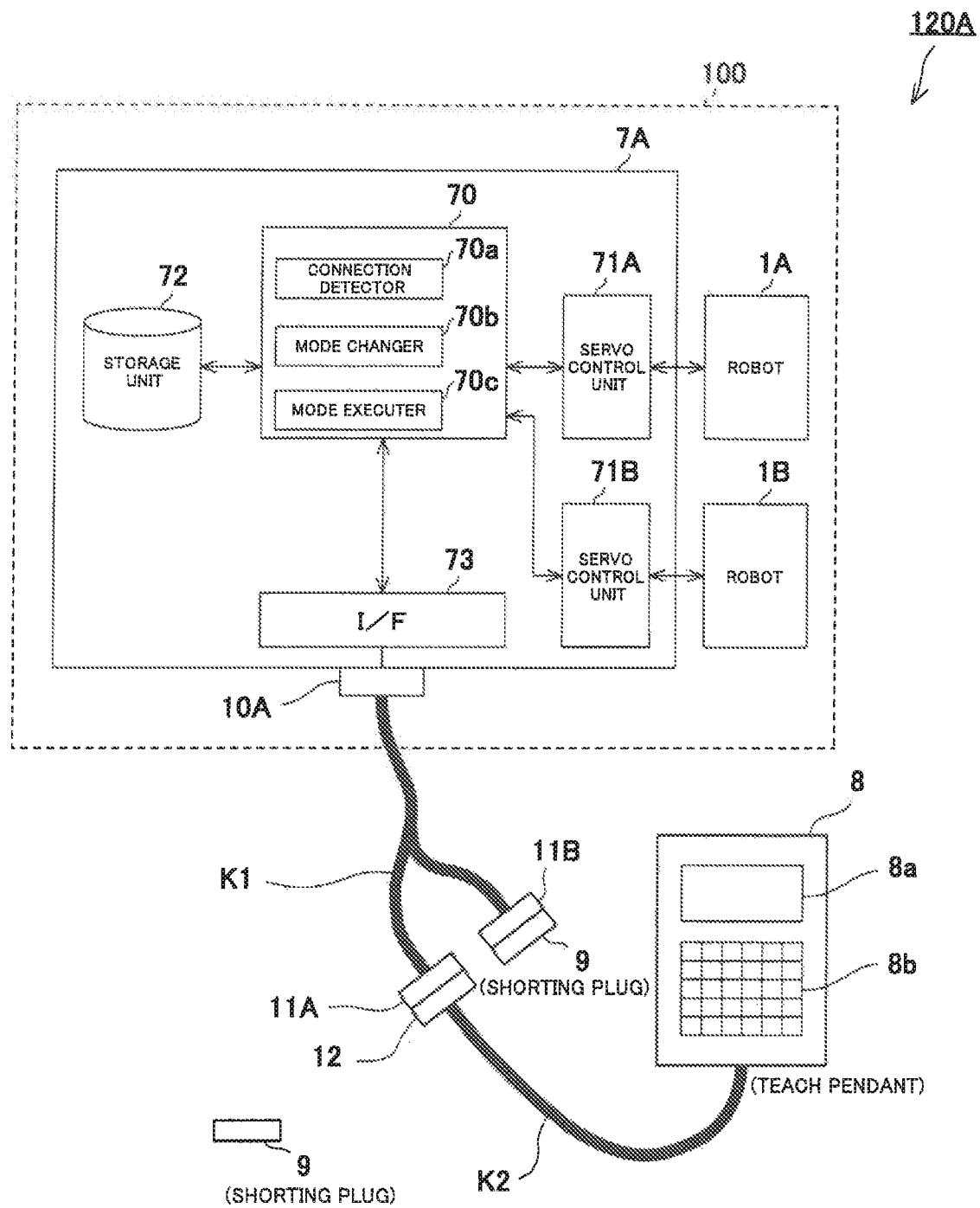
FIG. 6 is a block diagram schematically showing the configuration of a robot system according to Embodiment 2 of the present invention.

FIG. 6 is a block diagram schematically showing the configuration of a robot system according to Embodiment 2 of the present invention. As shown in FIG. 6, the present embodiment is different from Embodiment 1 (FIG. 1) in the following point: a robot system 120A of Embodiment 2 includes two robots 1A and 1B, two shorting plugs 9, and two relay connectors 11A and 11B. In the present embodiment, the controller cable K1 has two branched distal ends. The relay connector 11A is mounted to one distal end of the controller cable K1, and the relay connector 11B is mounted to the other distal end of the controller cable K1.

Operation Examples

Next, operation examples of the robot system 120A are described. First, as shown in FIG. 6, the operator connects the teach pendant 8 to the controller 7 in order to teach motions to a first robot 1A by using the teach pendant 8 (first connection mode). Here, the relay connector 11A mounted to the one distal end of the controller cable K1 is connected to the TP connector 12 mounted to the distal end of the teach pendant cable K2, and the relay connector 11B mounted to the other distal end of the controller cable K1 is connected to one of the shorting plugs 9.

Figure 7:
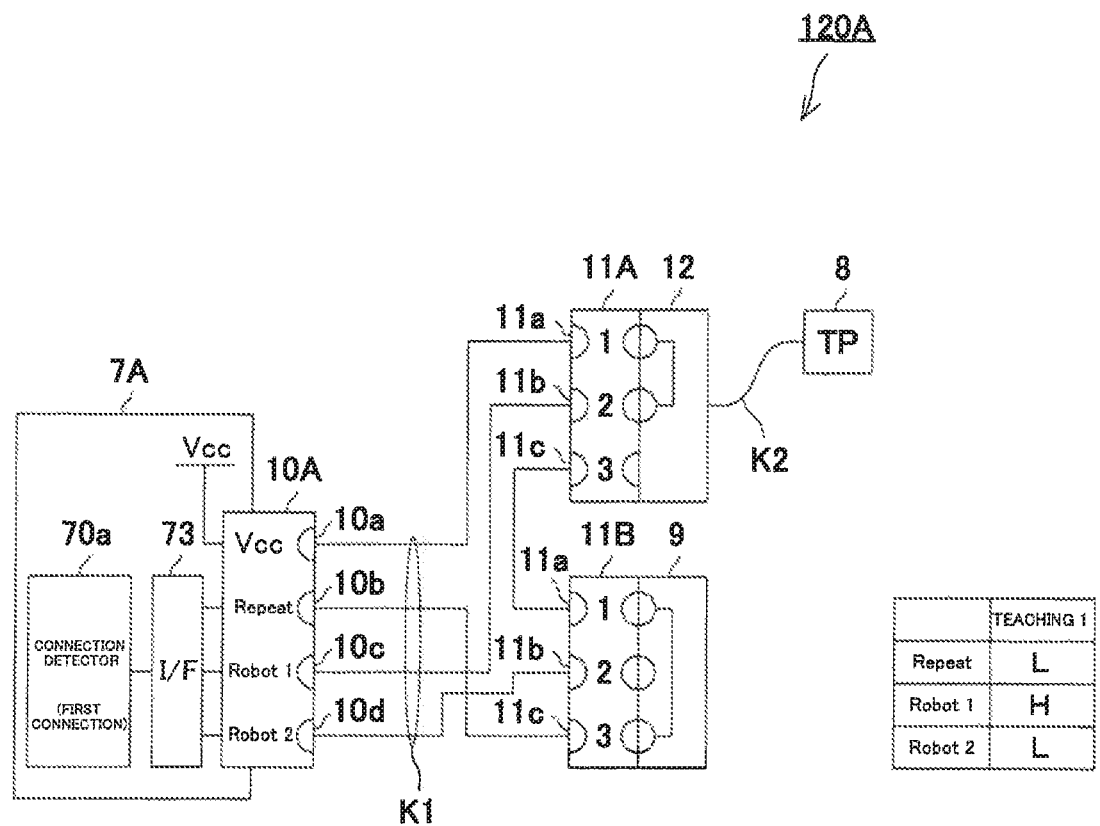
FIG. 7 shows the first connection mode of the robot system.

FIG. 7 shows the first connection mode of the robot system 120A. As shown in FIG. 7, an I/F connector 10A of the controller 7A includes: the power supply terminal $10a$, to which a power supply voltage (e.g., DC 24V) is supplied from an internal power supply (not shown) of the controller 7; the first input terminal $10b$, to which a detection signal (e.g., DC 24V) indicating disconnection is inputted; the second input terminal $10c$, to which a detection signal (e.g., DC 24V) indicating connection (first connection mode) is inputted; and a third input terminal $10d$, to which a detection signal (e.g., DC 24V) indicating connection (second connection mode) is inputted.

The first relay connector 11A is mounted to the one distal end of the controller cable K1. The first relay connector 11A includes: the first terminal $11a$ connected to the power supply terminal $10a$ of the I/F connector 10A; the second terminal $11b$ connected to the second input terminal $10c$ of the I/F connector 10A; and the third terminal $11c$ connected to the second relay connector 11B.

The second relay connector 11B is mounted to the other distal end of the controller cable K1. The second relay connector 11B includes: the first terminal $11a$ connected to the third terminal $11c$ of the first relay connector 11A; the second terminal $11b$ connected to the third input terminal $10d$ of the I/F connector 10A; and the third terminal $11c$ connected to the first input terminal $10b$ of the I/F connector 10A.

The TP connector 12 mounted to the distal end of the teach pendant cable K2 is configured to short-circuit the first terminal $11a$ and the second terminal $11b$ of the relay connector 11A. Accordingly, the first terminal $11a$ and the second terminal $11b$ of the relay connector 11A are short-circuited via the TP connector 12. The shorting plug 9 is configured to short-circuit the first terminal $11a$ and the third terminal $11c$ of the relay connector 11B. Accordingly, the first terminal $11a$ and the third terminal $11c$ of the relay connector 11B are short-circuited via the shorting plug 9.

The power supply voltage (e.g., DC 24V) is outputted from the power supply terminal $10a$ of the I/F connector 10A of the controller 7A, and the power supply voltage is inputted to the first terminal $11a$ of the relay connector 11A via the controller cable K1. Since the first terminal $11a$ and the second terminal $11b$ of the relay connector 11A are short-circuited via the TP connector 12, the power supply voltage is outputted from the second terminal $11b$ of the relay connector 11A, and the power supply voltage (i.e., high level voltage) is inputted to the second input terminal $10c$ of the I/F connector 10A via the controller cable K1.

Meanwhile, since the third terminal $11c$ of the relay connector 11A is shorted by the TP connector 12, the first terminal $11a$ of the relay connector 11B is also shorted. Since the first terminal $11a$ and the third terminal $11c$ of the relay connector 11B are short-circuited via the shorting plug 9, the first input terminal $10b$ of the I/F connector 10A, which is connected to the third terminal $11c$ of the relay connector 11B via the controller cable K1, is also shorted. At the time, since the second terminal $11b$ of the relay connector 11B is shorted by the shorting plug 9, the third input terminal $10d$ of the OF connector 10A, which is connected to the second terminal $11b$ of the relay connector 11B via the controller cable K1, is also shorted. In the present embodiment, in the first connection mode, a ground potential (i.e., low level voltage) is inputted to the first input terminal $10b$ and the third input terminal $10d$ of the I/F connector 10A.

The connection detector 70a detects the detection signal indicating connection (i.e., high level signal), which is inputted to the second input terminal 10c of the I/F connector 10A, thereby detecting the connection between the controller 7 and the teach pendant 8 (first connection mode). In the present embodiment, the mode changer 70b changes the operation mode in which to operate the first robot 1A to the teaching mode, and stops the second robot 1B from operating.

Figure 8:
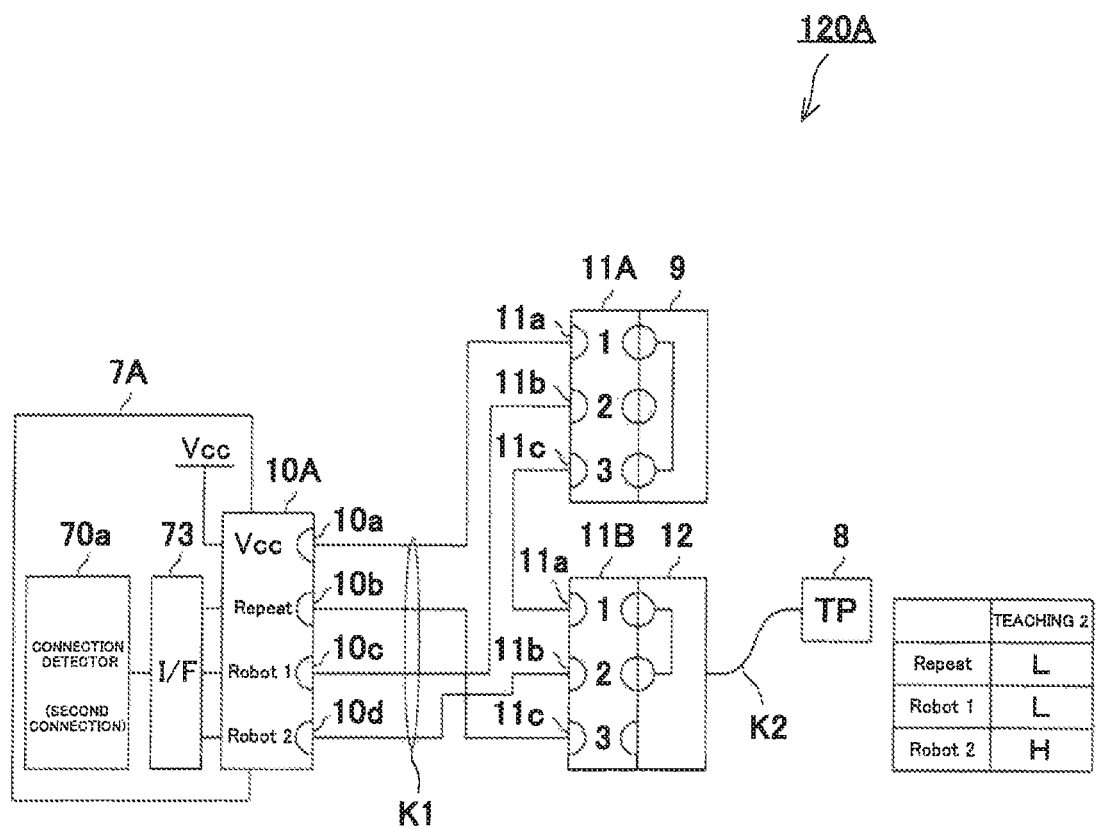
FIG. 8 shows the second connection mode of the robot system.

Next, the operator connects the teach pendant 8 to the controller 7 in order to teach motions to the second robot 1B by using the teach pendant 8 (second connection mode). FIG. 8 shows the second connection mode of the robot system 120A. As shown in FIG. 8, the relay connector 11A mounted to the one distal end of the controller cable K1 is connected to the shorting plug 9, and the relay connector 11B mounted to the other distal end of the controller cable K1 is connected to the TP connector 12 mounted to the distal end of the teach pendant cable K2.

The first terminal 11a and the third terminal 11c of the first relay connector 11A are short-circuited via the shorting plug 9. Meanwhile, the first terminal 11a and the second terminal 11b of the second relay connector 11B are short-circuited via the TP connector 12 mounted to the distal end of the teach pendant cable K2, and a power supply voltage (i.e., high level voltage) is inputted to the third input terminal 10d of the I/F connector 10A.

Since the second terminal 11b of the relay connector 11A is shorted by the shorting plug 9, the second input terminal 10c of the I/F connector 10A, which is connected to the second terminal 11b via the controller cable K1, is also shorted. Since the third terminal 11c of the relay connector 11B is shorted by the TP connector 12, the first input terminal 10b of the I/F connector 10A, which is connected to the third terminal 11c via the controller cable K1, is also shorted. In the present embodiment, in the second connection mode, a ground potential (i.e., low level voltage) is inputted to the first input terminal 10b and the second input terminal 10c of the I/F connector 10A.

The connection detector 70a detects the detection signal indicating connection (i.e., the power supply voltage), which is inputted to the third input terminal 10d of the I/F connector 10A, thereby detecting the connection between the controller 7 and the teach pendant 8. In the present embodiment, the mode changer 70b changes the operation mode in which to operate the second robot 1B to the teaching mode, and stops the first robot 1A from operating.

Figure 9:
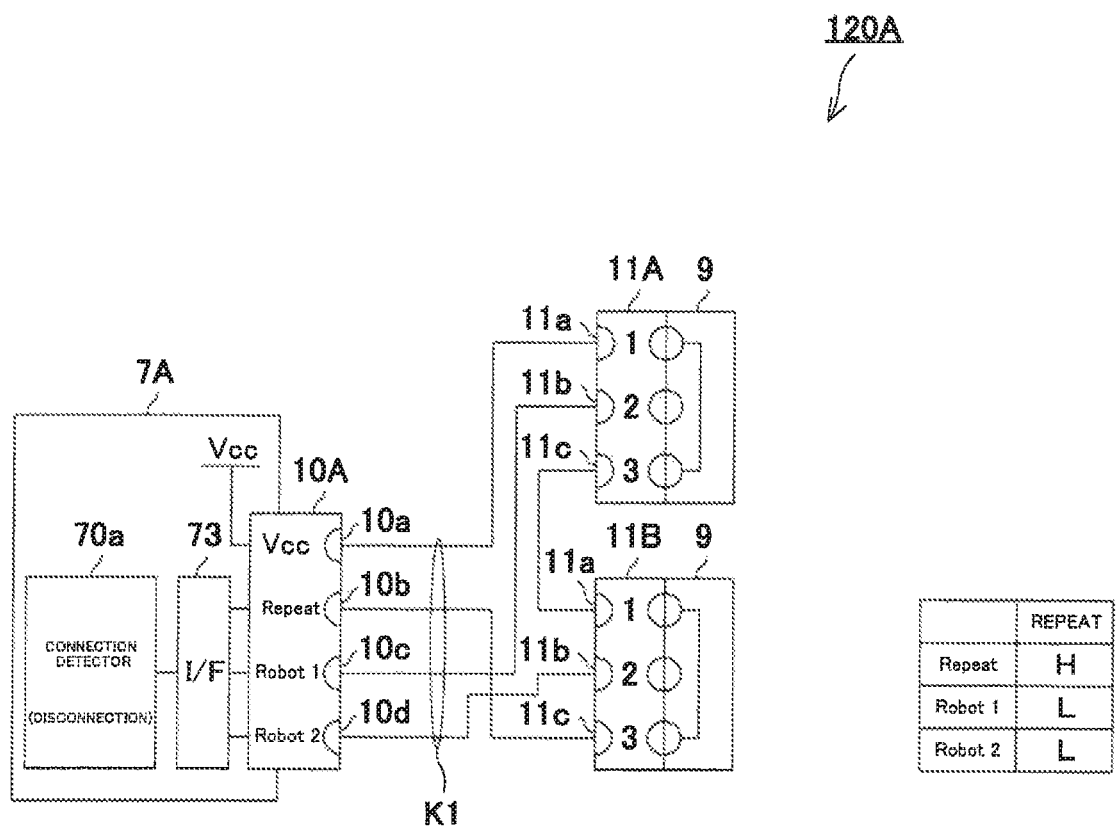
FIG. 9 shows a third connection mode of the robot system.

Lastly, in order to cause the first robot 1A and the second robot 1B to repeat the motions that have previously been taught in the teaching mode, the operator disconnects the teach pendant 8 from the controller 7 (third connection mode). FIG. 9 shows the third connection mode of the robot system 120A. As shown in FIG. 9, the two shorting plugs 9 are connected to the respective relay connectors 11A and 11B, which are mounted to the distal ends of the controller cable K1.

The first terminal 11a and the third terminal 11e of the first relay connector 11A are short-circuited via the first shorting plug 9, and the first terminal 11a and the third terminal 1c of the second relay connector 11B are short-circuited via the second shorting plug 9.

A power supply voltage (e.g., DC 24V) is outputted from the power supply terminal 10a of the I/F connector 10A of the controller 7A, and the power supply voltage is inputted to the first terminal 11a of the first relay connector 11A via the controller cable K1. Since the first terminal 11a and the third terminal 11e of the first relay connector 11A are short-circuited via the first shorting plug 9, the power supply voltage is outputted from the third terminal 11e of the first relay connector 11A and inputted to the first terminal 11a of the second relay connector 11B via the controller cable K1. Since the first terminal 11a and the third terminal 11c of the second relay connector 11B are short-circuited via the second shorting plug 9, the power supply voltage is outputted from the third terminal 11c of the second relay connector 11B, and the power supply voltage (i.e., high level voltage) is inputted to the first input terminal 10b of the I/F connector 10A via the controller cable K1.

Meanwhile, since the second terminal 11b of the relay connector 11A is shorted by the first shorting plug 9, the second input terminal 10c of the I/F connector 10A, which is connected to the second terminal 11b via the controller cable K1, is also shorted. Since the second terminal 11b of the relay connector 11B is shorted by the second shorting plug 9, the third input terminal 10d of the I/F connector 10A, which is connected to the second terminal 11b via the controller cable K1, is also shorted. In the present embodiment, in the third connection mode, a ground potential (i.e., low level voltage) is inputted to the second input terminal 10c and the third input terminal 10d of the I/F connector 10A.

The connection detector 70a detects the detection signal indicating connection (i.e., the power supply voltage), which is inputted to the first input terminal 10b of the I/F connector 10A, thereby detecting the disconnection between the controller 7 and the teach pendant 8. In the present embodiment, the mode changer 70b changes the operation mode in which to operate the first robot 1A and the second robot 1B to the repeat mode.

Accordingly, in the present embodiment, when the operator merely attaches/detaches the teach pendant 8 to/from the controller 7A connected to the two robots 1A and 1B, a mode change between the teaching mode and the repeat mode is performed automatically. That is, the controller 7A and the teach pendant 8 are connected to each other via the two relay connectors 11A and 11B. This allows the operator to attach/detach the teach pendant 8 to/from the controller 7 (i.e., perform a mode change) outside the semiconductor processing facility 100. Thus, the operator is not required to enter the facility to perform the attachment/detachment work. Consequently, the workload of the operator is reduced.

Further, in the present embodiment, in the first connection mode (see FIG. 7) or the second connection mode (see FIG. 8), when one robot 1A (or 1B) is in the teaching mode, the controller 7A can safely operate the robot system 120A by stopping the other robot 1B (or 1A) from operating.

Still further, in the present embodiment, in the third connection mode (see FIG. 9), the controller 7A is configured to change the operation mode to the repeat mode when the power supply voltage (i.e., high level voltage) is inputted to the first input terminal 10b of the I/F connector 10A. However, at the time, the controller 7A may change the operation mode not to the repeat mode, but to another operation mode different from the teaching mode, so long as this other operation mode does not require the use of the teach pendant 8.

OTHER EMBODIMENTS

Although the robot 1 in each of the above-described embodiments is realized by a horizontal articulated robot, the robot 1 may alternatively be realized by a vertical articulated robot, so long as the robot 1 is configured to be connected to a teach pendant and operated in operation modes including a teaching mode and a repeat mode. The use of the robot 1 is not limited to such industrial use as substrate transfer or welding.

The robot system 120 in each of the above-described embodiments has a hot swapping function, and the relay connectors are hot swapping connectors. The interface standard adopted by the robot system 120 is not particularly limited in the foregoing description. As one example, the robot system 120 may adopt an I/F that is compatible with USB and IEEE1394, and may be configured to detect connection/disconnection by means of the I/F and change the operation mode based on the detection result.

In each of the above-described embodiments, the robot 1 and the controller 7 are installed inside the semiconductor processing facility 100. However, as an alternative, the robot 1 and the controller 7 may be installed inside a safe guard fence. The installation location of the robot 1 and the controller 7 need not be particularly restricted.

In each of the above-described embodiments, the portable operation terminal is the teach pendant 8. However, as an alternative, the portable operation terminal may be a mobile information terminal, such as a tablet terminal or smartphone, so long as the mobile information terminal has a teaching function.

In each of the above-described embodiments, the controller 7 (7A) is configured to determine connection/disconnection when a high level signal (power supply voltage) is inputted to any one of the input terminals (10b to 10d) of the I/F connector 10 (10A), and change the operation mode based on the determination result. However, as an alternative, the signal level may be inversed. That is, the controller 7 (7A) may be configured to determine connection/disconnection when a low level signal (e.g., ground potential) is inputted to any one of the input terminals of the I/F connector 10 (10A), and change the operation mode based on the determination result.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is useful for a robot system that has operation modes including a teaching mode and other operation modes different from the teaching mode.

REFERENCE SIGNS LIST 1, 1A, 1B robot
7, 7A robot controller
8 teach pendant (portable operation terminal)
8a operating unit
8a display unit
9 shorting plug
10 I/F connector
10a power supply terminal
10b first input terminal
10c second input terminal
10d third input terminal
11 relay connector
11a first terminal
11b second terminal
11c third terminal
12 TP connector
70 arithmetic operation unit
70a connection detector
70b mode changer
70c mode executer
71 servo control unit
72 storage unit
73 I/F
100 semiconductor processing facility
120, 120A, 120B robot system
200 operation box

The invention claimed is:

1. A robot system comprising:
a first robot;
a portable operation terminal having a teaching function; and
a robot controller having operation modes including a teaching mode and another operation mode different from the teaching mode, the teaching mode being an operation mode for teaching a motion to the first robot through the portable operation terminal, wherein
the robot controller is configured to:
    detect electrical connection and electrical disconnection between the robot controller and the portable operation terminal;
    change an operation mode in which to operate the first robot to the teaching mode when detecting the connection between the robot controller and the portable operation terminal; and
    change the operation mode in which to operate the first robot to the other operation mode different from the teaching mode when detecting the disconnection between the robot controller and the portable operation terminal.

2. The robot system according to claim 1, further comprising:
a shorting plug, wherein
the robot controller further includes:
    an interface connector including a power supply terminal, a first input terminal, and a second input terminal; and
    a relay connector including a first terminal, a second terminal, and a third terminal, the first terminal being connected to the power supply terminal, the second terminal being connected to the second input terminal, the third terminal being connected to the first input terminal,
in a first connection mode in which the first terminal and the second terminal of the relay connector are short-circuited via a connector mounted to a distal end of a cable intended for the portable operation terminal, when a power supply voltage is inputted to the second input terminal, the robot controller detects the connection between the robot controller and the portable operation terminal, and changes the operation mode in which to operate the first robot to the teaching mode, and
in a second connection mode in which the first terminal and the third terminal of the relay connector are short-circuited via the shorting plug, when the power supply voltage is inputted to the first input terminal, the robot controller detects the disconnection between the robot controller and the portable operation terminal, and changes the operation mode in which to operate the first robot to the other operation mode different from the teaching mode.

3. The robot system according to claim 2, wherein
in the second connection mode, the other operation mode different from the teaching mode is a repeat mode.

4. The robot system according to claim 3, wherein the portable operation terminal is a teach pendant.

5. The robot system according to claim 2, wherein the portable operation terminal is a teach pendant.

6. The robot system according to claim 1, further comprising:
a second robot;
a first shorting plug; and
a second shorting plug, wherein
the robot controller further includes:
an interface connector including a power supply terminal, a first input terminal, a second input terminal, and a third input terminal;
a first relay connector including a first terminal, a second terminal, and a third terminal, the first terminal being connected to the power supply terminal, the second terminal being connected to the second input terminal; and
a second relay connector including a first terminal, a second terminal, and a third terminal, the first terminal being connected to the third terminal of the first relay connector, the second terminal being connected to the third input terminal, the third terminal being connected to the first input terminal,
in a first connection mode in which the first terminal and the second terminal of the first relay connector are short-circuited via a connector mounted to a distal end of a cable intended for the portable operation terminal, when a power supply voltage is inputted to the second input terminal, the robot controller detects the connection between the robot controller and the portable operation terminal, changes the operation mode in which to operate the first robot to the teaching mode, and changes the operation mode in which to operate the second robot to the other operation mode different from the teaching mode,
in a second connection mode in which the first terminal and the third terminal of the first relay connector are short-circuited via the first shorting plug, and the first terminal and the second terminal of the second relay connector are short-circuited via the connector mounted to the distal end of the cable intended for the portable operation terminal, when the power supply voltage is inputted to the third input terminal, the robot controller detects the connection between the robot controller and the portable operation terminal, changes the operation mode in which to operate the second robot to the teaching mode, and changes the operation mode in which to operate the first robot to the other operation mode different from the teaching mode, and
in a third connection mode in which the first terminal and the third terminal of the first relay connector are short-circuited via the first shorting plug, and the first terminal and the third terminal of the second relay connector are short-circuited via the second shorting plug, when the power supply voltage is inputted to the first input terminal, the robot controller detects the disconnection between the robot controller and the portable operation terminal, and changes the operation mode in which to operate the first robot and the second robot to the other operation mode different from the teaching mode.

7. The robot system according to claim 6, wherein
in the first connection mode, the other operation mode, which is different from the teaching mode and in which to operate the second robot, is a stop mode, and
in the second connection mode, the other operation mode, which is different from the teaching mode and in which to operate the first robot, is the stop mode.

8. The robot system according to claim 7, wherein
in the third connection mode, the other operation mode, which is different from the teaching mode and in which to operate the first robot and the second robot, is a repeat mode.

9. The robot system according to claim 7, wherein the portable operation terminal is a teach pendant.

10. The robot system according to claim 6, wherein
in the third connection mode, the other operation mode, which is different from the teaching mode and in which to operate the first robot and the second robot, is a repeat mode.

11. The robot system according to claim 10, wherein the portable operation terminal is a teach pendant.

12. The robot system according to claim 6, wherein the portable operation terminal is a teach pendant.

13. The robot system according to claim 1, wherein
the robot controller has a hot swapping function,
a controller-side connector and a portable-operation-terminal-side connector, by which the robot controller and the portable operation terminal are connected to each other, each include a ground terminal, a signal terminal, and a power supply terminal,
when the controller-side connector and the portable-operation-terminal-side connector are connected to each other, the ground terminals thereof are connected to each other first among the ground terminals, the signal terminals, and the power supply terminals of the controller-side connector and the portable-operation-terminal-side connector, and
when the controller-side connector and the portable-operation-terminal-side connector are disconnected from each other, the ground terminals thereof are blocked from each other last among the ground terminals, the signal terminals, and the power supply terminals of the controller-side connector and the portable-operation-terminal-side connector.

14. The robot system according to claim 13, wherein the portable operation terminal is a teach pendant.

15. The robot system according to claim 1, wherein the portable operation terminal is a teach pendant.

16. The robot system according to claim 1, wherein
the robot controller and the portable operation terminal are electrically connected merely by attachment of the portable operation terminal to the robot controller, and
the robot controller and the portable operation terminal are electrically disconnected merely by detachment of the portable operation terminal from the robot controller.

17. The robot system according to claim 16, wherein
the robot controller and the portable operation terminal are electrically connected and electrically disconnected to and from each other without stopping a main power supply to the robot controller.

18. A robot controller having operation modes including a teaching mode and another operation mode different from the teaching mode, the teaching mode being an operation mode for teaching a motion to a robot through a portable operation terminal having a teaching function, the robot controller being configured to:
- detect electrical connection and electrical disconnection between the robot controller and the portable operation terminal;
- change an operation mode in which to operate the robot to the teaching mode when detecting the connection between the robot controller and the portable operation terminal; and
- change the operation mode in which to operate the robot to the other operation mode different from the teaching mode when detecting the disconnection between the robot controller and the portable operation terminal.

19. The robot controller according to claim 18, wherein
the robot controller and the portable operation terminal are electrically connected merely by attachment of the portable operation terminal to the robot controller, and
the robot controller and the portable operation terminal are electrically disconnected merely by detachment of the portable operation terminal from the robot controller.

20. The robot controller according to claim 19, wherein the robot controller and the portable operation terminal are electrically connected and electrically disconnected to and from each other without stopping a main power supply to the robot controller.

* * * * *